Nov. 15, 1966    R. N. NORLIE    3,285,238
BARBECUE UNIT
Filed Aug. 4, 1964    3 Sheets-Sheet 1
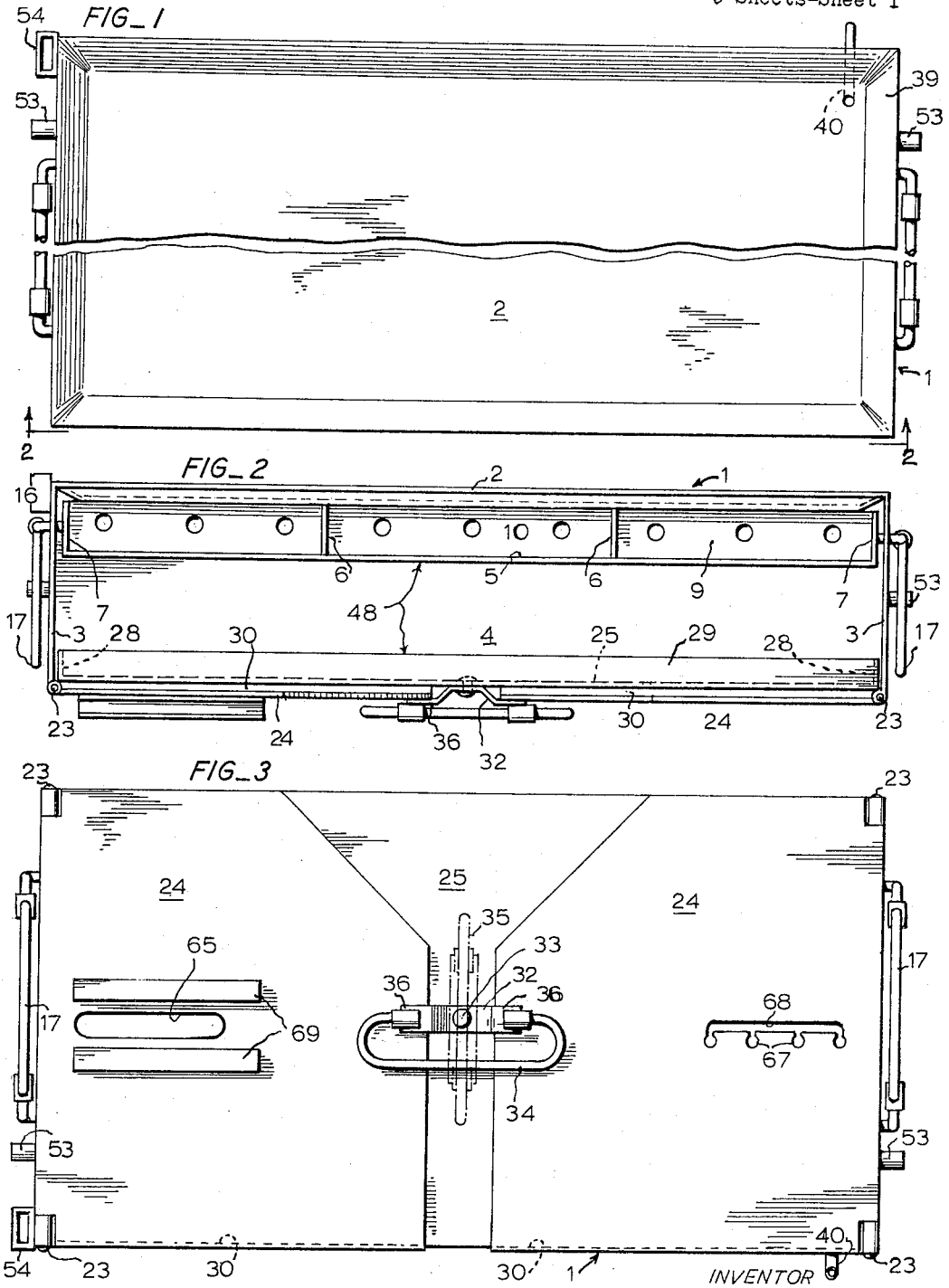
INVENTOR
ROBERT N. NORLIE
BY
Boykin, Mohler & Foster
ATTORNEYS

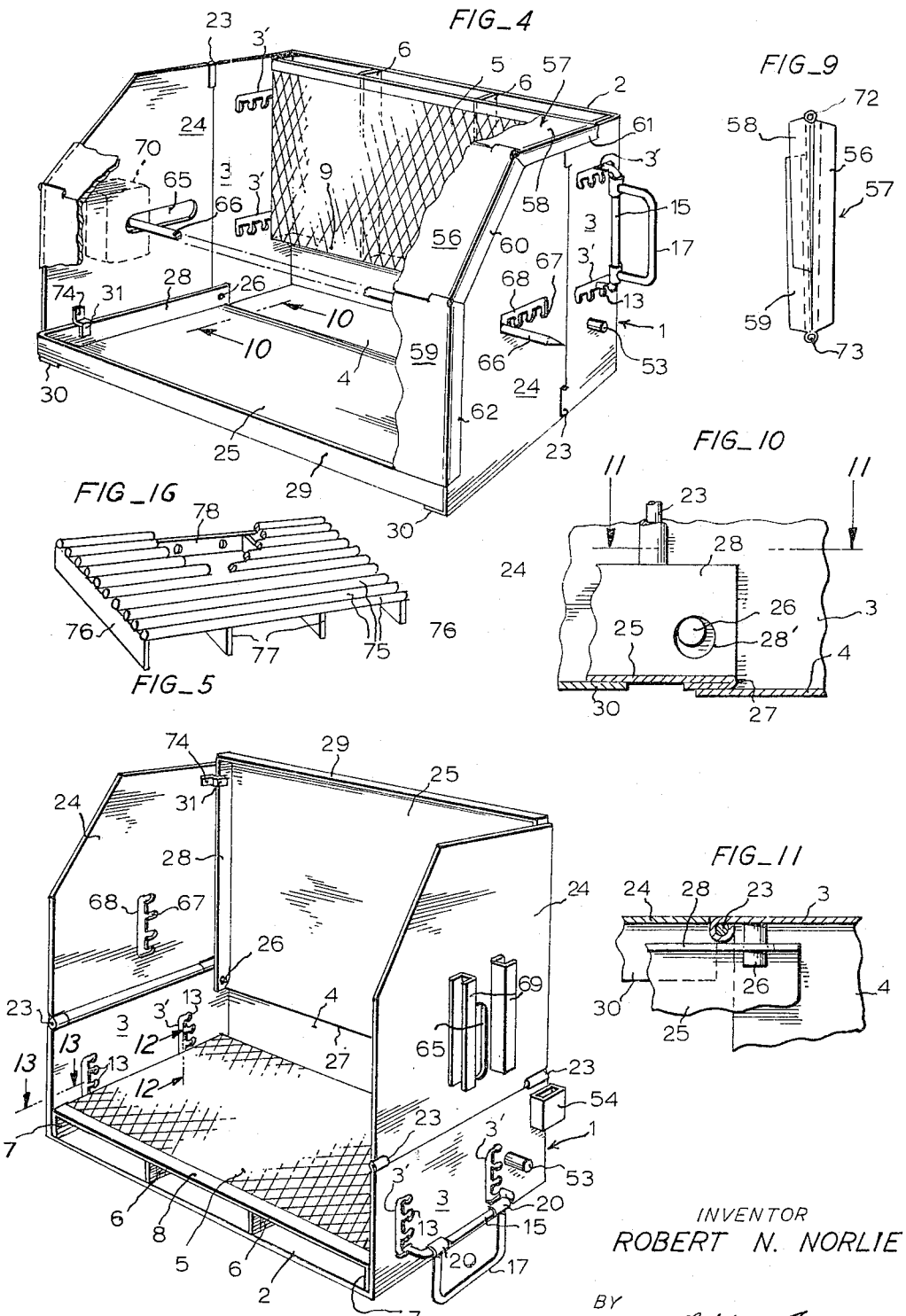

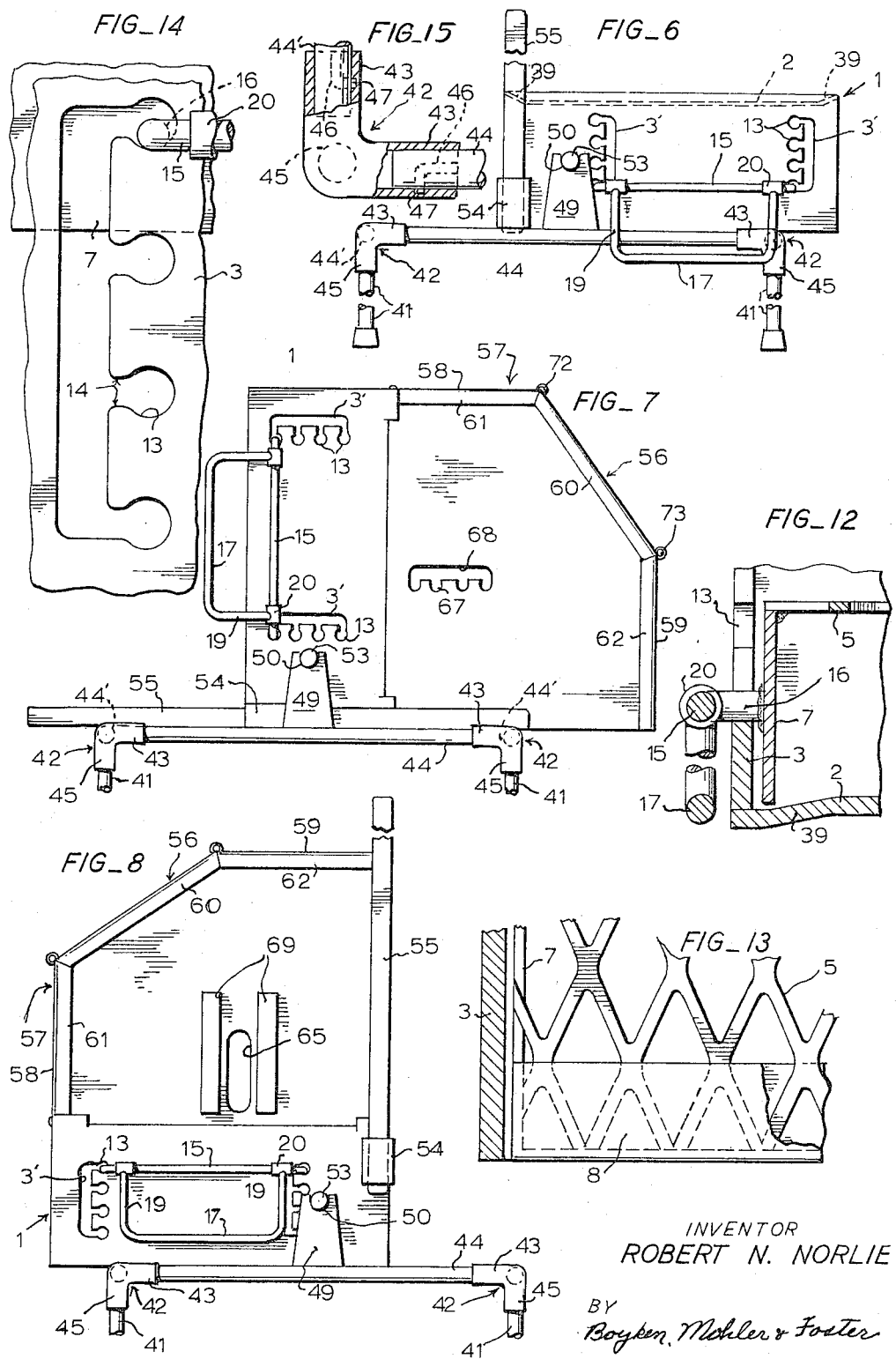

United States Patent Office 3,285,238
Patented Nov. 15, 1966

1

3,285,238
BARBECUE UNIT
Robert N. Norlie, Chico, Calif., assignor to Norfield
Manufacturing Co., Chico, Calif.
Filed Aug. 4, 1964, Ser. No. 387,400
7 Claims. (Cl. 126—9)

This invention relates to a barbecue unit, and has for one of its objects, the provision of a compact, rugged, portable barbecue unit that has a relatively large capacity, and which unit is adapted for use in performing a plurality of different cooking operations, such as broiling, roasting, frying, smoking, baking by the use of charcoal or charcoal briquettes for fuel.

Another of the objects of the invention is the provision of a barbecue unit that is adapted to be used for charcoal broiling of meat or other cooking on a horizontal grill in one position of the unit, and that may be quickly repositioned for broiling or roasting meat, etc. supported on a spit alongside the bed of coals with said grill vertically along one side of the spit, and that may again be quickly positioned for frying on a plate that functions to retain the bed of coals horizontally, the same bed being employed for cooking in all three positions.

An added object is the provision of a barbecue unit that, in addition to the above-mentioned uses, is also provided with means for protecting the coals and food from wind, dust, etc., and which means also provides for use of the broiler for smoking food, if desired.

An added object of the invention is the provision of a barbecue unit that enables a more economical use of charcoal than heretofore, and to more efficiently broil or fry meat, as desired, by heat from the charcoal.

A still further object of the invention is the provision of a barbecue unit that is collapsible to a relatively small, rectangular box that, in turn, is adapted to contain all of the removable elements of the unit including the stand and cover.

Another object of the invention is the provision of a barbecue unit for grill broiling, spit broiling, and frying, and which broiler includes as a part thereof means for protecting the coals against wind, dust, leaves, etc., and is more readily cleaned than heretofore and that does not require a bed of sand or the like below the grill portion.

An added object is the provision of a barbecue unit for grill broiling, spit broiling, frying and smoking, and which unit is pivotally supported for quickly changing it for the type of cookng to be done, and in which device provision is made for quickly adjusting the bed of coals for controlling the temperature at the cooking area.

The majority of charcoal barbecue units provide for a horizontal bed of coals and a horizontal grill thereover for supporting meat or food to be cooked or heated, or a spit for roasting meat. In the latter instance, the drippings from the roast drop into the bed of coals, where they are burned, causing flames and smoke. Such units, while portable, are not suitable for taking on camping trips since they are relatively large and cumbersome, and are wheel mounted. Their normal place is in a patio or the like, and usually in a place where a building offers some degree of protection against the wind.

The present invention is equally adapted for patio use, and the structure employed therein may be adopted in a permanent installation, if desired. However, the present invention provides a compact barbecue unit that may readily and easily be taken on a camping trip and quickly set up for use, either for broiling meat supported directly over a horizontal bed of coals, or for spit-roasting or broiling at a lateral side of a vertical bed of coals, or for frying eggs, bacon, hotcakes, etc. on

2 a horizontal plate, or for baking biscuits or for smoking meat, all from a single bed of coals in which a single grill and imperforate walls of a relatively flat firebox are employed.

The same invention as above described has an automatic drain for grease when used for frying, and it does not require a bed of sand or other refractory material and is readily cleared of ashes, and is provided with structure that enables selective heating of different cookareas as well as enabling different cooking temperatures in different cooking areas, if desired, and which structure further provides for fast starting of charcoal and a more uniform distribution of heat than heretofore with less charcoal.

Other objects and advantages will appear in the description and drawings.

In the drawings, FIG. 1 is a plan view of the firebox in collapsed condition looking down on the imperforate wall thereof that is in spaced, opposed relation to the grill.

FIG. 2 is a side elevational view as seen from line 2—2 of FIG. 1.

FIG. 3 is a plan view of the collapsed firebox showing the side opposite to that seen in FIG. 1.

FIG. 4 is a perspective view of the firebox set up for performing a roasting or baking operation in which a separate, collapsible hood is indicated and broken away to show the arrangement of the grill.

FIG. 5 is a perspective view showing the firebox set up with the grill horizontal for broiling meat or the like supported thereon. The same hood shown in FIG. 4 is adapted to be positioned thereon, but is omitted therefrom.

FIG. 6 is an end elevational view of the firebox set up on a stand for a frying operation.

FIG. 7 is an end elevational view of the firebox set up substantially as seen in FIG. 4 but on a special stand therefor.

FIG. 8 is an end elevational view showing the firebox in the stand of FIG. 7 with the firebox arranged as seen in FIG. 5.

FIG. 9 is an end elevational view of the hood indicated in FIGS. 4, 7, 8 in a collapsed position separate from the firebox.

FIG. 10 is an enlarged, fragmentary, cross-sectional view taken along line 10—10 of FIG. 4.

FIG. 11 is an enlarged, fragmentary, cross-sectional view as seen from the line 11—11 of FIG. 10.

FIG. 12 is an enlarged, fragmentary, cross-sectional view taken along line 12—12 of FIG. 5.

FIG. 13 is an enlarged, fragmentary, cross-sectional view taken generally along line 13—13 of FIG. 5.

FIG. 14 is an enlarged, fragmentary elevational view of a portion of the firebox as seen from the end or side thereof seen in FIG. 5.

FIG. 15 is an enlarged, part sectional, part elevational view of one of the fittings for the legs and frame illustrated as a support for the barbecue unit.

FIG. 16 is a reduced size perspective view, partly broken away, showing a modified form of the grill shown in preceding figures.

Remarks

The firebox of the invention, as illustrated, is generally designated 1, and comprises a rectangular bottom wall 2, (FIG. 5) opposed upstanding vertical end walls 3 and a lateral side wall 4 integral with and extending upwardly from the end edges and one side edge of said bottom wall 2.

In FIGS. 2 and 6, the bottom wall 2 is uppermost, and in FIG. 4 it is vertical; hence, the word bottom is not intended to refer to the position of the wall 2 in all of the various cooking positions of the firebox. Likewise, side wall 4 in FIG. 4 is the lowermost wall; hence, it is not always shown in a position at a lateral side of the firebox.

Referring again to FIG. 5, an open-work grill 5 is shown as spaced above, and in parallel relation to the bottom wall 2, and which grill is shown as being of diamond mesh expanded metal. Between said grill and the bottom wall 2 are perforate strips 6 that may be of the same type of metal as grill 5, which strips are parallel with each other and with end walls 3. Said strips are welded along their upper edges to the grill 5, and extend completely across the grill.

Flanges 7, also welded to the grill 5, extend downwardly from grill 5 alongside end walls 3, and are of approximately the same width as the strips 6.

The side of the firebox opposite to side wall 4 is open, and this may be called the "forward" side since it is the side adjacent to the cook when the firebox is in the position shown in FIG. 5. The forward edges of the strips 6 and grill 5 may be enclosed and welded to a metal band 8 that is folded over the forward edge of the grill to provide a smooth forward edge, (FIGS. 5, 13).

A narrow wall 9 (FIG. 2) is welded to grill 5 along the edge of the latter that is adjacent to the side wall 4, and which narrow wall is positioned at a right angle to grill 5 and is formed with perforations 10.

The wall 9 and strips 6 and flanges 7 are of approximately the same width, and extend toward the bottom wall 2.

The end walls 3 are each formed with a pair of slots 3', (FIG. 8), extending transversely thereof. Along one of the corresponding sides of slots 3' are recesses 13 that respectively open into the adjacent slot through a restricted neck portion 14, (FIG. 14).

The flanges 7 on grill 5 extend transversely across the pairs of slots 3' in the end wall 3 adjacent thereto, and rigidly secured to each flange 7 is an elongated, horizontally extending rod 15 that is outside each end wall 3. The opposite end portions 16 of each rod 15 respectively extend through each slot 10 in each end wall 8 and are rigidly connected with the flange 7 that is at the side of the slots opposite to each rod 15.

Swingingly secured to each rod 15 is a lifting handle 17. Each handle may comprise a horizontal bar having right angle end sections 19 that, in turn, have sleeves 20 on their ends rotatable on each handle. The handles may be heat insulated or of heat insulated material if desired.

An operator may grasp the handles 17 and lift the grill to the desired height and then move the grill toward the side wall 4 so that end portions 16 on the rod 15 will move through the necks 14 of the recesses 13 that are at said height, and when the grill is then lowered the portions 16 will seat in the recesses 13 (FIG. 14), and the grill must again be lifted and the portions 16 moved laterally through necks 14 and into slots 10 to move the grill to a new position.

When the grill is in its lowermost position as seen in FIG. 5, it will be spaced from the bottom wall 2 by approximately the width of the strips 6, flanges 7 and the narrow wall 9.

Preferably, the grill 5 and the narrow wall or strip 9 terminate a distance short of the side wall 4 as seen in FIGS. 4, 5. In FIG. 4 the grill 5 is vertical and the space between the grill and side wall 4 is clearly seen.

It is pertinent to note that the bottom wall 2, end walls 3 and side wall 4 may be relatively thick, such as 3/16 of an inch. When the barbecue unit is used with the grill 5 horizontal and above wall 2, as seen in FIG. 5, so as to support meat or food thereon, the coals will be supported directly on bottom wall 2. The strips 6 may function, if desired, to restrict the bed of coals to substantially the central portion of the grill between the central pair of strips 6 or it may cover the bottom wall 2, or be substantially restricted to different areas such as at one end of the grill or the other or at both ends. In addition, however, said strips, as well as flanges 7, prevent warpage of the grill due to temperature changes.

Hingedly secured at 23 to the end walls 3 along their edges that are opposite to bottom wall 2, are a pair of correspondingly shaped side wings 24. FIG. 3 shows these side wings in folded, collapsed position over a flat wall 25 that, in turn, is rectangular and of approximately the same dimensions as the bottom wall 2.

Said flat wall 25 is pivotally connected to end walls 3 by coaxial pivots 26 (FIGS. 4, 5, 10, 11). Only one of the pivots is shown, but they are the same at each end wall.

Edge 27 of the flat wall 25 extends between the end walls 3 parallel and adjacent to the free edge of side wall 4, and said edge 27 is smooth, rather than sharp, since it defines the bend between a folded over marginal portion of the wall 25 (FIG. 10), which folded over portion also reinforces the wall along said edge.

Wall 25 is provided with flanges 28 along the two edges thereof adjacent to the edge 27 and a flange 29 on said wall extends along the edge thereof that is opposite to edge 27. Said flanges 28, 29 are normal to wall 25 and the pivots 26 are rigid with end walls 3 and extend through relatively large openings 28' formed in flanges 27 (FIG. 10).

Said flanges 28, 29 extend toward grill 5 when wall 25 is swung to a position opposed to the grill (FIG. 2), said flanges 28 being adjacent to walls 3 and between them.

The reason for the enlarged openings 28' is that the marginal portion of wall 25 along edge 27 is adapted to lap the adjacent marginal portion of wall 4 along the free edge of the latter and to engage the latter in said lapping relation when wall 25 is swung from a position opposed to grill 5 to a position in a plane parallel with side wall 4. The enlarged openings 28' enable sufficient play of wall 25 for the marginal portion along edge 27 to swing about pivots 26.

Each of the side wings 24 is formed with a flange 30 along the edges thereof that extend away from the ends of side wall 4 when said side wings are swung to opposed relation (FIGS. 4, 5), and these flanges extend under the flat wall 25 in a position extending over the outer surfaces of wall 25 along flanges 27 when the wall 25 is swung between the outswung wings 24 to a position substantially parallel with wall 4. Clips 31 pivotally supported on wings 24 are adapted to swing over the free edges of flanges 27 on the wall 25 for releasably holding the wings 24 to wall 25 and at right angles to the latter (FIGS. 4, 5). When the wings 24 are outfolded and secured to wall 25, it should be noted that the flanges 30 on the wings support wall 25 when wall 25 is horizontal as seen in FIG. 4.

Referring to FIGS. 2, 3, when wall 25 and sidewings 24 are in collapsed position, the side wings overlie the wall 25, and locking piece in the form of a strip 32 releasably holds the wings and wall 25 in collapsed position in which they are substantially flat across the grill 5, although spaced therefrom.

The piece 32 is centrally secured to wall 25 by a pivot 33 in a position between the adjacent edges of the side wings 24. A bail handle 34 is swingably secured at its ends to the ends of strip 32. Upon rotating the piece 32, which may be called a "locking means," to dotted position 35 (FIG. 3) in which it is parallel with the adjacent edges of wings 24 when the latter are in collapsed position, the wings may readily be outfolded to the position shown in FIGS. 4, 5, for securement by clips 31 to the flanges 27 of wall 5. Upon rotating locking piece 32 to its full line position in FIG. 3, the end portions 36 overlie the adjacent marginal portions of the side wings 24.

FIGS. 2, 4, 5, show the firebox in the three of its different positions. In these views it is shown without a stand, or support, inasmuch as it could be supported on the ground or on any suitable support.

In FIG. 2 the unit is in a position for use in frying, the bottom wall 2 being uppermost, and the upwardly facing surface is smooth to provide a frying surface. The marginal portions 39 slant downwardly from the outer edges of the wall 2 to provide against grease draining over the edges, but the downwardly slanted marginal portions are also provided to insure against warpage of the top, it being understood that the edges of wall 2 are integral with the end walls 3 and side walls 4. A drain tube or conduit 40 opens at one end through the frying surface of wall 2 at one corner and extends downwardly therefrom and outwardly through side wall 4, and may project from said side wall as seen in FIG. 1 so that the bail of a can or receptacle (not shown) may extend over the projecting end to support such receptacle for catching the grease draining through the tube.

In FIG. 2 the grill 5 is in its uppermost position, and when in its lowermost position it would be closely adjacent to the wall 25 which is shown below the grill in a position to catch any ashes that may drop through the grill.

FIGS. 6–8 each show a stand having four supporting legs 41, (only the near two legs are shown) which stand is illustrative of one means for supporting the barbecue unit.

The legs 41 each have a fitting 42 (FIG. 15) at its upper end, each fitting being similar to a pipe fitting having a pair of right angle sockets or arms 43 for one of the ends of such adjacent pair of horizontal tubular frame members 44, 44′ that make up the horizontally disposed rectangular frame supported by the legs, each fitting having a depending socket or arm 45 into which the upper end of each leg 41 is secured. The arms 43 may each be internally grooved at 46 to cooperate with a lateral projection 47 on the end of each frame member 44, 44′ to provide a quick bayonet coupling, although it is to be understood that any of different connections may be provided. Preferably the frame members and legs are adapted to be separated when the barbecue unit is collapsed for storage or for transport since the legs and frame members are adapted to fit within the space 48 (FIG. 2) when positioned generally diagonally across the space from one corner thereof toward the diagonally opposite corner. The legs and frame members are preferably of aluminum or aluminum alloy.

Each of two opposed frame members 44 is provided with a bearing support 49 having an upwardly opening recess 50 therein (FIGS 6–8) adapted to rotatably support coaxial outwardly protecting stub shafts 53 (FIGS. 1, 6) that are rigid on end walls 3 of the firebox 1.

These stub shafts are positioned substantially midway between the longitudinally extending edges of the end walls at one of the corresponding ends of the pair of end walls and about the same distance from the end of each wall that is adjacent thereto, so that the bottom wall 2, side wall 4 (and wall 25 connected with wall 4, when the latter is outfolded) will each be approximately even with the upper surfaces of the other two opposed frame members 44′ when the firebox is rotated so that bottom wall 2, or side wall 4 is lowermost.

The spacing between the opposed frame members 44′ is such that the portion of the firebox adjacent to the open side will be supported on one or the other of the frame members 44′ according to the position to which the firebox is rotated.

One of the end walls 3 of the firebox 1 has an open ended sleeve 54 (FIG. 6) secured thereto, which sleeve is at the end of the firebox nearest to one of the stub shafts 53 and the sleeve extends transversely of the length of the end wall to which it is secured. A bar 55 (FIG. 6) is adapted to slide through sleeve 54 and the sleeve is so positioned that its end portions will engage the frame members 44′ adjacent to one of their corresponding ends when it extends approximately equal distances from the opposite ends of sleeve 54, as seen in FIG. 7.

In operation, assuming the firebox is to be positioned vertically for roasting or broiling meat to be positioned alongside the firebox, the firebox is held vertically by bar 55 and by the wall 25, as seen in FIG 7. The wall 25 has, of course, been swung outwardly to horizontal position over one of the frame members 41′ and the side wings are in outfolded position and latched to the wall 25, and bar 55 extends over and in engagement with the upper surfaces of the frame members 44′, hence the firebox cannot fall over accidentally.

FIG. 4 shows the firebox and wall 25 and side wings in the position it occupies in FIG. 7, except the stand is not shown.

In FIGS. 4 and 7, it is important to note that the upper outer corners of the side wings 24 are removed to provide downwardly slanting edges extending at approximately 45° relative to horizontal. This is to provide slanting surfaces or edges for supporting the horizontally elongated central panel 56 of a hood thereon. This hood is generally designated 57 and is shown in collapsed position separate from the firebox in FIG. 9.

A top panel 58 is hingedly connected with the central panel 56 along one of the longitudinally extending edges of the latter, and a front panel 59 is hingedly connected with panel 56 along the other longitudinally extending edge of the latter. Flanges 60, 61, 62 are respectively at opposite ends of panels 56, 58, 59 and are in lapping relation to the oppositely outwardly facing surfaces of the marginal portions of said panels over which the latter extend.

These panels may be of a aluminum or the like, having polished or reflecting surfaces that generally face the firebox, including the undersurface of panel 58, although, at least it is desirable that the surfaces of the panels that are adapted to reflect most of the radiant heat from the vertical bed of coals onto the food being cooked should be polished to give good reflective properties.

In baking biscuits, for example, the pan of biscuits (not shown) may be supported in any desired manner at any desired elevation above the wall 25. Bricks, rocks or any suitable article may be used.

One of the wings 24 is provided with an elongated slot 65 through which a motor-driven or manually-rotatable spit 66 may extend, with the opposite end of the spit being rotatably supported within one of a plurality of recesses 67 that open upwardly into a horizontally extending slot 68 that is opposite to slot 65 but formed in wing 24 that is opposite to the wing in which slot 65 is formed.

Extending longitudinally of slot 65 and at opposite sides thereof is a pair of parallel horizontally extending rails 69 (FIG. 5) on which a conventional motor 70 (FIG. 4) may be adjustably supported for driving the spit.

When the spit is used, and meat is held thereon, any conventional pan or platter may be supported on wall 25 to catch the dripping.

The hood 57 may be removed and the space between the bottom wall 2 and the grill 5 filled to the desired level with fuel, such as charcoal or charcoal briquettes, with which any conventional starter may be mixed, or such starter may be in the lower portion of such space. The grill is usually held in its nearest position to the wall 2 when loaded and the grill is vertical. If desired, any one or combinations of the areas between partitions or strips 6 may be loaded with charcoal, according to the heat requirements for the food to be cooked.

It should be noted that the slots 3′ and recesses 13 in the wings function to hold the grill in adjusted position relative to the wall 2 and to enable movement of the grill to the adjusted position, even when the grill is vertical.

Once the charcoal is lighted, it quickly reaches the desired stage for broiling or cooking, and after the food to be cooked is in the desired position, the hood may be supported on the wings 24. In some instances it is desirable to have the front panel open; hence, it can swing up to overlie panel 56, or if an examination of the meat is desired, the panel 58 may be swung to position overlying panel 56. The spacing between the flanges 61 may be slightly wider than those on panel 59 so the hood may be collapsed to the position shown in FIG. 9 in which it may also be stored in space 48 between the grill and the wall 25 when the firebox is in collapsed position shown in FIG. 2.

The starting position for the firebox may in each instance be that in which the firebox is vertical, in which position a faster starting is possible since the grill and wall 2 provide a modified flue open at the upper end. Also, loading the space between the grill and wall through the open upper end of the space between the grill and wall 2 is easy and fast, and in most permanent horizontal fireboxes it is usual to use a much larger quantity of fuel than is necessary.

In view of the foregoing, where the operation is one in which food is to be fried, the charcoal may be started as described, with the firebox vertical, and the wings 24 and wall 25 may then collapsed and locked in collapsed position and the bar 55 moved to the left from the position shown in FIG. 7 to clear the right hand frame member 44'. The bar 55 may then be used to swing the firebox to the position shown in FIG. 6, in which position it will be supported horizontal by sub-shafts 53 and end frame member 44'. The cooking plate or wall 2 will then be uppermost and the operator may adjust the charcoal supporting grill 5 to any desired position below the wall 2. Here again the perforated partition strips 6 enable confining the charcoal to the desired area; hence, if a hotter area is desired at one point than at another, it is only necessary to put the charcoal at one or both ends or between partitions 6, and the heat will be conducted by wall 2 to the areas where a lower temperature may be desired.

If the firebox is to be used for supporting meat directly thereon, and is loaded with charcoal when in the vertical position, as has already been described, it may be swung from the position shown in FIG. 7 to the position in FIG. 8 without collapsing the side wings and wall 25, and said wings and wall 25 will function as wind shields relative to the grill. Also, the hood 57 may be supported on wings 24 to retain the heat or to provide varied ventilation according to which of the panels is swung over the central panel.

In FIG. 8 the coals will be supported on the bottom wall 2 and the grill 5 may be quickly raised or lowered to the desired position over the bed of charcoal.

When the hood is used as seen in FIGS. 4, 7 and 8, it is important to note that the hood 57 does not extend over the open side of the firebox, which open side more or less functions as the upper open end of a flue in FIGS. 4, 7, or as a lower air inlet in FIG. 8.

If the cooking operation is one that involves smoking the meat or food, the barbecue unit may be in the position shown in FIG. 8 and the front panel may be raised to deposit the desired shavings onto the bed of coals for producing the smoke. The hood and side walls 24 will retain the smoke around the food, and the spit assembly may be used to support the food above the grill. A spit alone, irrespective of the motor, may be supported at the lower end of slots 65, 68.

In FIGS. 7, 8, and 9, the pivot 72 hingedly connects panels 56, 58, while pivot 73 hingedly connects the panels 56, 59.

The clips 31 that connect the wings 24 with flanges 28 of the flat wall 25 are each pivotally connected by a pivot 74 with each wing 24.

While the grill 5 has been described as being of expanded metal, which is economical to make, in many instances the grill may be formed of uniform diameter cylindrical metal rods 75 (FIG. 16) which are preferably plated or treated to resist rust.

End flanges 76, strips 77 and a wall 78 substantially corresponding to flanges 7, strips 6 and wall 9 corresponding to those shown in FIGS. 4, 5 are welded to the row of rods 75 to perform the same functions as the latter, although the flanges 7 and strips 77 also function to hold the rods 75 in one plane and in equally spaced, parallel, side-by-side relation.

It is to be understood that the foregoing detailed description is not to be necessarily restrictive of the invention, inasmuch as it is obvious that various modifications may be made therein, therefore, the scope of the invention should be limited only to the scope of the claims appended hereto.

I claim:

1. A portable barbecue unit comprising:
 (a) a horizontally disposed firebox having a horizontal bottom wall on which solid fuel for cooking is adapted to be supported, a pair of upstanding end walls and an upstanding sidewall along the edges of said bottom wall rigidly secured to the latter;
 (b) a horizontal grill in a position between said end walls in spaced, opposed, substantially parallel relaiton to said bottom wall on which food to be cooked is adapted to be positioned, said grill having end edges adjacent to said end walls and a side edge adjacent to said side wall and the side of said firebox opposite to said side wall being open for lateral access to the upper side of said grill and to the space between said grill and said bottom wall;
 (c) said firebox being movable to a vertically disposed position in which said side wall is lowermost and said bottom wall and grill are vertical and in which position the space between said bottom wall and said grill opens upwardly and grill holding means respectively on said grill and said firebox movable relatively from a released position for movement of said grill in directions toward and away from said bottom wall to different distances from the latter, to a holding position at each of said different distances, holding said grill against movement toward and away from said bottom wall, and vice versa;
 (d) a horizontally extending, vertical, perforated wall rigid with said grill along said side edge thereof extending from said grill toward said bottom wall in spaced opposed relation to said side wall when said firebox is horizontally disposed and which perforated wall is at the lower end of said grill when said firebox is vertical to support coals between said grill and said bottom wall spaced above said side walls.

2. A portable barbecue unit comprising:
 (a) a horizontally disposed firebox having a horizontal bottom wall on which solid fuel for cooking is adapted to be supported, a pair of upstanding end walls and an upstanding sidewall along the edges of said bottom wall rigidly secured to the latter;
 (b) a horizontal grill in spaced, opposed, substantially parallel relation to said bottom wall on which food to be cooked is adapted to be positioned, said grill having end edges adjacent to said end walls and a side edge adjacent to said side wall and the side of said firebox opposite to said side wall being open for access to the space between said grill and said bottom wall;
 (c) said firebox being movable to a vertically disposed position in which said side wall is lowermost and said bottom wall and grill are vertical and in which position the space betwen said bottom wall and said grill opens upwardly;
 (d) a horizontally extending narrow wall rigid with said grill extending between said grill and said bottom wall when said grill is in its lowermost position and said firebox is horizontal, reinforcing said grill and providing a partition below said grill;
 (e) said grill including said narrow wall being movable as a unit to each of said different distances from said bottom wall when said holding means are in said released position, grill moving means connected with said grill for so moving the latter, and said grill holding means including grill supporting means supporting said grill at each of said different distances from said bottom wall.

3. In a barbecue unit as defined in claim 2:
(f) a pair of flanges rigid with said grill along said two opposite end edges thereof and parallel with said narrow wall extending substantially to said bottom wall when said firebox is horizontal and said grill is in its lowermost position;
(g) said grill holding means including corresponding vertically elongated slots formed in said end walls when said firebox is horizontal, each slot having a row of laterally extending recesses formed along one edge thereof and each recess opening laterally into each slot at one of its ends and closed at its opposite end, a member rigid with each of said flanges projecting through each slot and movable longitudinally of the latter when said grill holding means are in said released position, and movable into said recesses in said row at each of said different distances to said holding position, said recesses opening upwardly into said slots when said firebox and slots are vertical;
(h) said grill moving means being extensions connected with said members projecting outwardly of said end walls for manual grasping at the outer sides of said end walls outwardly of said firebox;
(i) said grill supporting means comprising the lower edges of said recesses into which said members are adapted to be moved from said lots when said firebox is horizontal and comprising the closed ends of said recesses when said firebox is vertical.

4. A portable barbecue unit comprising:
(a) a horizontally disposed firebox having a horizontal bottom wall on which solid fuel for cooking is adapted to be supported, a pair of upstanding end walls and an upstanding sidewall along the edges of said bottom wall rigidly secured to the latter;
(b) a horizontal grill in spaced, opposed, subtantially parallel relation to said bottom wall on which food to be cooked is adapted to be positioned, said grill having end edges adjacent to said end walls and a side edge adjacent to said side wall and the side of said firebox opposite to said side wall being open for access to the space between said grill and said bottom wall;
(c) said firebox being movable to a vertically disposed position in which said side wall is lowermost and said bottom wall and grill are vertical and in which position the space between said bottom wall and said grill opens upwardly;
(d) said firebox including a flat wall thereon of approximately the same outline and dimensions as said bottom wall swingably supported for movement about a horizontal axis parallel with and adjacent to the edge of said side wall that is remote from said bottom wall from a position in spaced opposed relation to said grill to a position extending at substantially a right angle to said bottom wall and approximately parallel with and extending away from said side wall when said firebox is in its said vertically disposed position to provide a support for said firebox in addition to said side wall, and to provide a horizontal drip or baking pan adjacent to the lower edge of said grill and offset to the side of said grill opposite to said bottom wall, and said bottom wall being substantially imperforate;
(e) means on said firebox connected with said flat wall and said firebox for supporting a horizontal rotary spit in a position extending across the vertical face of said grill and over said flat wall when said firebox is in its vertically extending position and for releasably holding said flat wall against upward swinging when said firebox is in its said vertically extending position and said flat wall extends at said right angle thereto.

5. A portable barbecue unit comprising:
(a) a horizontally disposed firebox having a horizontal bottom wall on which solid fuel for cooking is adapted to be supported, a pair of upstanding end walls and an upstanding sidewall along the edges of said bottom wall rigidly secured to the latter;
(b) a horizontal grill in spaced, opposed, substantially parallel relation to said bottom wall on which food to be cooked is adapted to be positioned, said grill having end edges adjacent to said end walls and a side edge adjacent to said side wall and the side of said firebox opposite to said side wall being open for access to the space between said grill and said bottom wall;
(c) said firebox being movable to a vertically disposed position in which said side wall is lowermost and said bottom wall and grill are vertical and in which position the space between said bottom wall and said grill opens upwardly;
(d) the surface of said bottom wall that faces away from said grill being smooth to provide a frying surface for food when said firebox is in a horizontally disposed position with said bottom wall uppermost relative to said grill and the marginal portions of said bottom wall extending slantingly from the edges of said bottom wall toward said grill to reinforce said bottom wall against warping under temperature changes and to prevent discharge of grease over said outer edges of said bottom wall when said frying surface faces upwardly, said firebox being movable for so positioning said bottom wall with said frying surface facing upwardly;
(e) said grill being formed with relatively small perforations to permit passage of air therethrough while supporting charcoal and the like thereon.

6. In a barbecue unit as defined in claim 5:
(f) a drain conduit rigid with said bottom wall adjacent to said marginal portion thereof opening through said frying surface at one end and opening outwardly of said firebox at the other end for draining grease from said frying surface when the firebox is in a position with said frying surface facing upwardly;
(g) a flat wall on said firebox disposed below said grill in opposed relation thereto when said firebox is horizontal with said frying surface facing upwardly.

7. A portable barbecue unit comprising:
(a) a horizontally disposed firebox having a horizontal bottom wall on which solid fuel for cooking is adapted to be supported, a pair of upstanding end walls and an upstanding sidewall along the edges of said bottom wall rigidly secured to the latter;
(b) a horizontal grill in spaced, opposed, substantially parallel relation to said bottom wall on which food to be cooked is adapted to be positioned, said grill having end edges adjacent to said end walls and a side edge adjacent to said side wall and the side of said firebox opposite to said side wall being open for access to the space between said grill and said bottom wall;
(c) said firebox being movable to a vertically disposed position in which said side wall is lowermost and said bottom wall and grill are vertical and in which position the space between said bottom wall and said grill opens upwardly;
(d) a flat wall of approximately the same outline and dimensions as said bottom wall;
(e) means swingably supporting said flat wall on said firebox for swinging about a horizontal axis parallel with and adjacent to the edge of said side wall that is remote to said bottom wall from a position in spaced opposed relation to said bottom wall to a position extending perpendicular thereto and extending upwardly from said side wall when said firebox is horizontal to provide a wind shield and a reflecting surface for heat from coals adapted to be supported on said grill when said grill is horizontal above said bottom wall;
(f) side wings of sheet metal hingedly secured to said end walls and swingable to positions projecting upwardly from said end walls and in spaced opposed relation and at substantially right angles to said flat wall when the latter extends upwardly from said side wall and said firebox is horizontal to provide side wind shields at the ends of said firebox;
(g) means for releasably securing said side wings to said flat wall when said side wings are in said spaced opposed relation perpendicular to said flat wall;
(h) a hood releasably supported on said side wings and flat wall when said firebox is horizontal and said side wings and flat wall extend upwardly therefrom to enclose the area over said grill;
(i) said hood including a horizontal panel in opposed relation to said grill swingable upwardly about a horizontal axis to open the upper side of said hood, and said hood further including a vertical panel in opposed relation to said flat wall swingable upwardly about a horizontal axis for opening a lateral side of said hood; and an intermediate panel between said horizontal panel and said vertical panel with which said panels are swingably connected for swinging upwardly.

References Cited by the Examiner
UNITED STATES PATENTS

| | | | |
|---|---|---|---|
| 2,627,854 | 2/1953 | Sava | 126—25 |
| 2,746,378 | 5/1956 | Lang | 126—25 X |
| 2,962,019 | 11/1960 | Lundgren | 126—9 X |
| 3,018,772 | 12/1962 | Blazey | 126—25 |
| 3,053,245 | 9/1962 | Beller | 126—25 |

FOREIGN PATENTS
231,482  12/1960  Australia.

FREDERICK L. MATTESON, JR., *Primary Examiner.*
E. G. FAVORS, *Assistant Examiner.*